March 13, 1945. P. F. SCOFIELD 2,371,268
GENERATOR FIELD STRUCTURE
Filed Nov. 18, 1942
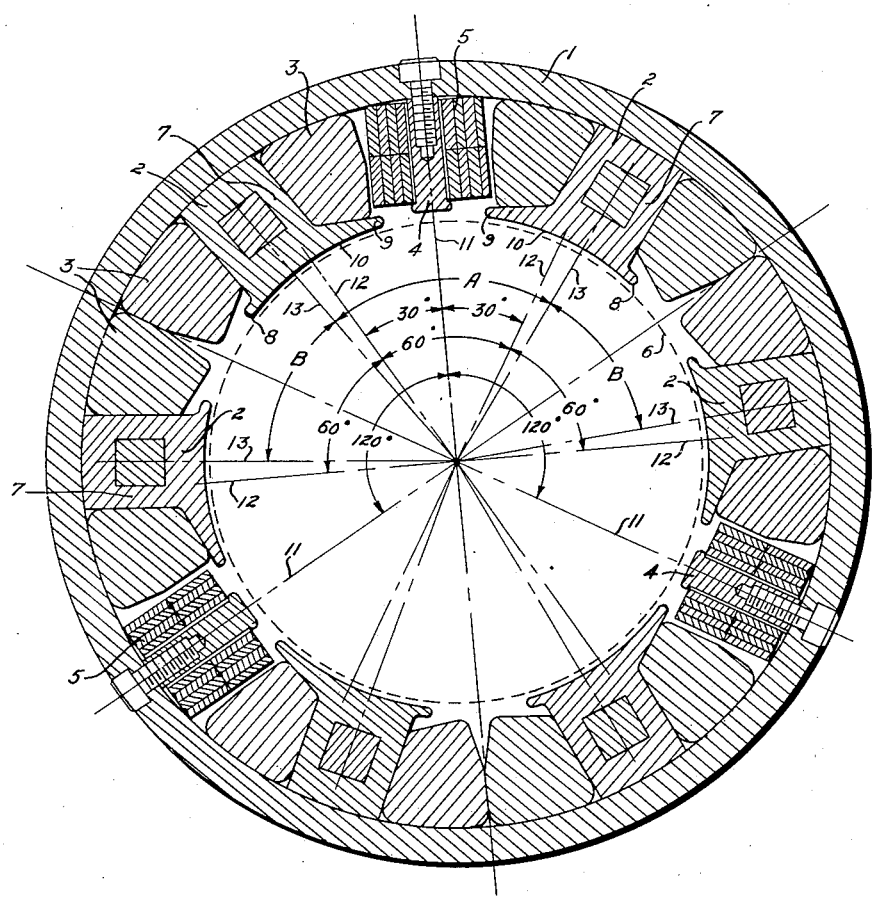
INVENTOR.
PHILIP F. SCOFIELD
BY
Frank H. Harmon
ATTORNEY Patented Mar. 13, 1945

2,371,268

UNITED STATES PATENT OFFICE 2,371,268

GENERATOR FIELD STRUCTURE

Philip F. Scofield, Cleveland Heights, Ohio, assignor to Jack & Heintz, Inc., Bedford, Ohio, a corporation of Ohio Application November 18, 1942, Serial No. 466,025

3 Claims. (Cl. 171—252)

This invention relates to an improved field structure for direct current generators.

The object of the invention is to provide a novel and improved field structure for high output direct current generators to facilitate the introduction of larger windings on the field poles and interpoles than is possible in conventional construction.

A particular object is to provide a novel pole structure furnishing increased space between the poles and interpoles for field windings.

The single figure in the drawing is a cross sectional view through a preferred embodiment of generator, illustrating the principles of my invention.

Referring now to the drawing, the present generator comprises generally a housing 1, six field poles 2 with windings 3, three interpoles 4 with windings 5, and an armature 6 shown in outline. The generator is designed for aircraft use to give extremely high output with respect to its size and weight as judged by conventional standards, special cooling facilities being employed in order to obtain the maximum possible output from a given weight of copper and iron. The present invention aims to achieve this purpose through a more compact arrangement of the copper and iron components of the electrical and magnetic circuits to attain a higher efficiency in the use thereof.

Each pole 2 has a shank 7 to receive the winding 3, and an offset pole face 10 having oppositely directed extensions in the form of a short heel 8 and an elongated toe 9. These pole faces 10 and the interpoles 4 are arranged uniformly and symmetrically around the interior of the housing 1, the three interpoles being spaced 120° on centers and the six pole faces 10 being spaced 60° on centers, the interpoles being midway between the pole faces of alternate pairs, as shown. On adjacent poles 2 the heel portions 8 face toward each other, the toe portions 9 facing toward the interpoles 4, whereby the pole shanks 7 are spaced farther apart in the intervals containing interpoles. The offset distance of the pole shanks 7 with respect to the pole faces 10 is such as to bring the windings 3 on the heel sides of adjacent poles together, and to leave sufficient space between the windings 3 on the toe sides for the interpole windings 5. The several windings 3 and 5 will then occupy all the available space in the most compact manner possible, to accomplish the objects of the invention.

It will be seen that while the spacing of the pole faces 10 is maintained uniform at 60° around the casing, the pole shanks 7 are arranged so that adjacent shanks between interpoles are spaced less than 60° on centers, as shown by the angle "B" and shanks separated by interpoles are spaced more than 60° as indicated by the angle "A." The numerals 11 indicate centerlines of the interpoles 4, the numerals 12 indicate centerlines of the field pole faces 10, and the numerals 13 represent centerlines of the field pole shanks 7.

The contours of the heel and toe portions 8 and 9 are such as to provide the desired flux distribution, and may be made to produce the same distribution as though the heel and toe overhangs were the same.

While the invention has been described in connection with a D. C. generator having a six pole field structure it is not intended to limit the invention to this specific embodiment. The present principles may be applied to other field structures having a different number of poles, and various other changes and modifications will occur to those skilled in the art. It is intended to limit the invention only by the appended claims and the scope of the prior art.

I claim:

1. A field structure comprising three interpoles spaced 120° apart, six field pole faces spaced 60° apart on centers and symmetrically arranged with respect to said interpoles, and pole shanks carrying said field pole faces, the spacing of said shanks being greater than 60° in intervals containing interpoles and less than 60° in remaining intervals, to accommodate windings for all of said poles in abutting relation.

2. A field structure comprising a plurality of uniformly spaced interpoles, a plurality of uniformly spaced individual field pole faces, and a corresponding number of individual pole shanks carrying said respective field pole faces, said shanks being offset on said faces so that the center-to-center spacing of said shanks is greater than the center-to-center spacing of the corresponding pole faces in intervals containing interpoles and less than the center-to-center spacing of the pole faces in intervals not containing interpoles, to accommodate windings for all of said poles and interpoles in compact relation for the maximum utilization of available space for windings.

3. A field structure comprising a circular casing, a plurality of at least three interpoles uniformly spaced therearound, a plurality of at least six individual field pole faces uniformly spaced around said casing, and individual pole shanks carrying said respective field pole faces, said shanks being offset on said faces so that the center-to-center spacing of said shanks is greater than the center-to-center spacing of the corresponding pole faces in intervals containing interpoles and less than the center-to-center spacing of the pole faces in intervals not containing interpoles, to accommodate windings for all of said poles and interpoles in compact relation for the maximum utilization of available space for windings.

PHILIP F. SCOFIELD.